United States Patent
Miftakhov

(10) Patent No.: US 11,577,846 B2
(45) Date of Patent: Feb. 14, 2023

(54) MODULAR ELECTRIC POWERTRAIN CONVERSION FOR AIRCRAFT

(71) Applicant: ZeroAvia, Inc., Hollister, CA (US)

(72) Inventor: Valery Miftakhov, San Carlos, CA (US)

(73) Assignee: ZeroAvia, Inc., Hollister, CA (US)

( * ) Notice: Subject to any disclaimer, the term of this patent is extended or adjusted under 35 U.S.C. 154(b) by 491 days.

(21) Appl. No.: 16/798,279

(22) Filed: Feb. 21, 2020

(65) Prior Publication Data

US 2021/0261260 A1    Aug. 26, 2021

(51) Int. Cl.
    *B64D 27/24*        (2006.01)
(52) U.S. Cl.
    CPC .................................. *B64D 27/24* (2013.01)
(58) Field of Classification Search
    CPC ........ B64D 27/24; B64D 2221/00; B64C 7/02
    USPC ...................................................... 244/53 R
    See application file for complete search history.

(56) References Cited

U.S. PATENT DOCUMENTS

| 4,554,989 A * | 11/1985 | Gruich .................... | B60K 6/00 |
| | | | 180/65.265 |
| 11,420,534 B1 * | 8/2022 | Palombini ............... | B60L 58/18 |
| 2020/0277061 A1 * | 9/2020 | Becker .................. | B64D 27/06 |
| 2022/0055762 A1 * | 2/2022 | Clarke .............. | H01M 8/04029 |

FOREIGN PATENT DOCUMENTS

| DE | 102020126045 A1 * | 4/2022 | |
| EP | 3786068 A1 * | 3/2021 | ............. B64D 27/02 |
| EP | 4032802 A1 * | 7/2022 | ............... B64C 3/14 |
| EP | E P-4032810 A1 * | 7/2022 | |
| EP | 4040628 A1 * | 8/2022 | ............. B64D 27/24 |
| WO | WO-2008086774 A2 * | 7/2008 | ............. B64D 27/24 |
| WO | WO-2015138217 A1 * | 9/2015 | ............. B64C 27/08 |
| WO | WO-2020003181 A1 * | 1/2020 | ............. B60L 50/75 |
| WO | WO-2022129811 A1 * | 6/2022 | |
| WO | WO-2022157245 A1 * | 7/2022 | |
| WO | WO-2022177577 A1 * | 7/2022 | |

* cited by examiner

Primary Examiner — Christopher P Ellis

(57) ABSTRACT

An aircraft power plant comprising a monolithic powertrain block with a composition of individual modules grouped by functionality, further comprising electric motors, high power motor controllers, logical control electronics (drivetrain computer), cooling system, hydraulics system, low voltage power system, and high voltage power source, wherein the engine mounting frame of the airplane is the main structure for mounting all individual modules.

19 Claims, 2 Drawing Sheets

MODULAR ELECTRIC POWERTRAIN CONVERSION FOR AIRCRAFT

CROSS-REFERENCE TO RELATED PATENT APPLICATION

This regular U.S. patent application relies upon and claims the benefit of priority from U.S. provisional patent application No. 62/808,313, entitled "MODULAR ELECTRIC POWERTRAIN CONVERSION FOR AIRCRAFT," filed on Feb. 21, 2019, which is incorporated by reference herein in its entirety.

BACKGROUND OF THE INVENTION

Field of the Invention

The disclosed embodiments relate in general to clean energy-based air transportation systems technology, and, more specifically, to modular electric powertrain conversion for aircraft.

Description of the Related Art

In the aviation industry the manufacturer of the airplane is usually the company that designs and builds an airplane frame (e.g. fuselage, wing, tail, etc.). Other components including electronic devices, navigation systems etc. are manufactured by $3^{rd}$ parties and are installed in designated places in the airframe. The same concept applies to the aircraft propulsion system. Airframe is designed with mounting structures and communications for a specific propulsion system. Propulsion system is a complex monolithic mechanism comprised of many sub-systems. For example, a turbine engine, reduction gear, cooling system, hydraulic system and a propeller comprise a propulsion system for a typical turbo-propeller aircraft. Single propeller piston engine aircrafts have a more simple propulsion system design.

SUMMARY OF THE INVENTION

The inventive methodology is directed to methods and systems that substantially obviate one or more of the above and other problems associated with conventional technology.

In accordance with one aspect of the embodiments described herein, there is provided an aircraft power plant comprising a monolithic powertrain block with a composition of individual modules grouped by functionality, further comprising electric motors, high power motor controllers, logical control electronics (drivetrain computer), cooling system, hydraulics system, low voltage power system, and high voltage power source, wherein engine mounting frame of the airplane is the main structure for mounting all individual modules.

Additional aspects related to the invention will be set forth in part in the description which follows, and, in part, will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
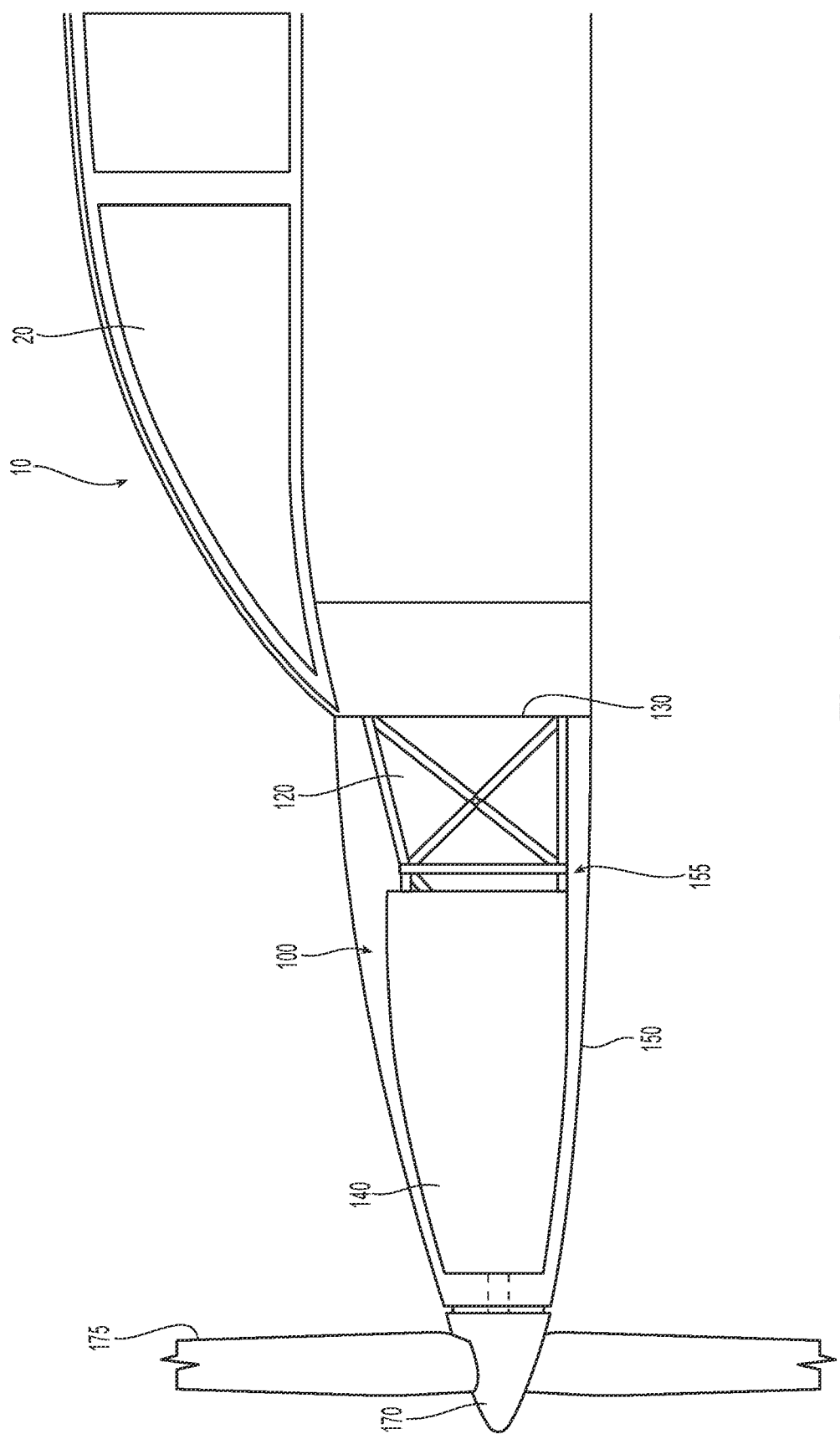
FIG. 1 illustrates an exemplary embodiment of a combustible powertrain for a conventional single engine aircraft.
Figure 2:
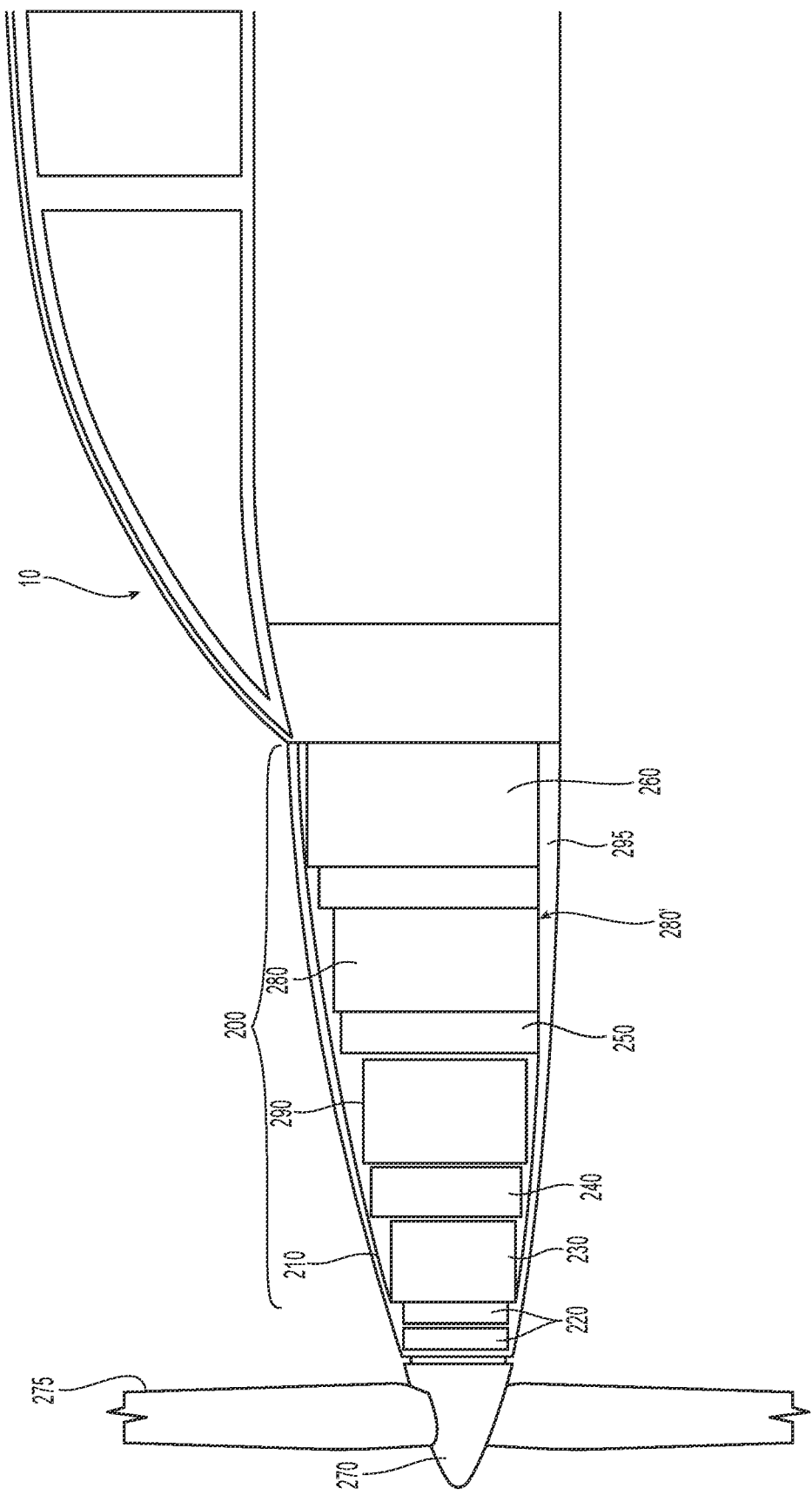
FIG. 2 illustrates another exemplary embodiment of modular electric powertrain conversion for aircraft.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

We propose a modular approach for the design of an electric propulsion system. This concept replaces a monolithic block with several stand-alone systems that can be individually inspected, maintained and replaced. Replacement of one of the modules in such a system can be performed without significant disturbance for other systems. Another significant advantage of such an approach is that a standardized module can be replaced by a module of a different manufacturer, or module with different characteristics as needed for a current application.

Modular electric powertrain design assumes seamless integration with an existing aircraft. All the aircraft avionics, gauges on pilot's dashboard, navigation systems etc. will work the same way they work with conventional engines. Several gauges such as fuel indicator, oil pressure, and others that are not relevant to electric powertrain can be renamed and reused for displaying appropriate parameters. All the sensors and signal wires that are normally associated with internal combustion or turbo engines will have plug-in appropriate modules to display useful information and not confuse the airplane avionics. This approach ensures that only minimal changes need to be introduced to the aircraft when replacing conventional engines using fossil fuel with zero emission electric powertrain.

Conventional Design:

The present invention is applied to propeller airplanes because propeller propulsion is currently the most efficient method of using combustion and electricity as a power source for airplanes. Powertrain systems 100 for such aircrafts come as a single module installed in a designated area under the wing or in the front cowl (or both). This powertrain block 100 is mounted via an engine mount 120 to the engine frame which is an integral part of the airplane fuselage or wing. Normally an airplane is designed to be used with one specific powertrain system that is installed as a single module.

Example of Single Propeller Aircraft

In one-propeller airplanes 10 with a propeller 175 located in front (or nose 170), the motor 140, e.g., an internal combustion engine, is mounted on a motor frame 120. Other accessories and front landing gear are also installed on this motor frame mount 120. The mount 120 itself is attached to a firewall 130 located in front of the pilot's windshield 20. Through the firewall 20, the motor mount 120 is attached to the main aircraft frame and presents a very solid structural piece. The mount 120 is typically short in length and protrudes forward because the rest of the space in the front cowl 150 is taken by a monolithic motor 140. The motor 140 is typically held by four or more bolts through hard rubber shock absorbing bushings to dampen the motor vibration. The motor 140 may be a large monolithic combustion or an electrical motor.

The present invention eliminates the monolithic powertrain block (either combustion or electric) and introduces a powertrain 200 composed of individual modules grouped by functionality. Such a system 200 will contain (without being limited by this list) electric motors 200, high and low power motor controllers 280, logical control electronics (drivetrain computer) 250, cooling systems 240, 265, accessories 230, e.g., hydraulics system, high and low voltage power sources, e.g., fuel cells 260.

In this design the engine mounting frame 210 of the airplane 10 is the main structure for mounting all individual modules. This allows the replacement of modules independently without affecting other modules.

Motor Module

Depending on the desired total power output and power/dimension characteristics of individual motors, the motor module 220 can contain two (2) or more electric motors. Motors are mechanically connected in series driving a single shaft of a propeller 275. Standard motor mounting interfaces will allow different motor types by different manufacturers to be installed with minimal system alterations. Permanent magnet motors or asynchronous induction motors can be used depending on a particular application need.

Motor High Power Controllers

Motor controllers 280, 250 are often designed to be used with specific motors. They differ in shape and dimensions but have a common electrical interface—DC high voltage input and 3-phase output to the motor 220. Additionally motor controllers 280, 250 have a cooling interface and a logical interface, which also differ between models. The presently disclosed modular approach provides a subframe 290 where motor controllers 280, 250 may be packed in accordance with their form factor. This lightweight subframe 290 with installed controllers 280, 250 can then be replaced as a single module 280' or each module, e.g., control module 250, may be replaced individually in the subframe 290. The location of this module 280' should be chosen in a way to minimize the length of any High Voltage AC cables, which may mean the controller module 280' should be located physically close to electric motors 220.

Cooling System

The cooling system 240 typically consists of fluid pumps, heat exchangers (radiators), fluid reservoirs and communication hoses. In embodiments, all components are packed together as a single module 240. Depending on the configuration, the cooling system 240 may contain one or several independent cooling loops using different non-mixable fluids. Design of this cooling system 240 module includes a mounting interface for the main drivetrain frame as well as interfaces for various coolant hoses.

Low Voltage Module

The low voltage supply may form part of the modular accessories 230 and is essential for powering all aircraft components (drivetrain electronics, avionics, etc.). The low voltage supply 230 typically consists of a low voltage battery (possibly several for redundancy) and a low voltage generation/charging system. The charging system may be designed using conventional low voltage alternators driven by a main shaft of a propeller 275, or DC-DC high voltage to low voltage converters or combination of both. As with the other modules described herein, the low voltage supply module 230 may be removed for repair or maintenance without affecting other modules.

Hydraulics

The hydraulics module may also be an accessory module 230 and provides hydraulic fluid pressure for various aircraft systems. One of the common uses of hydraulic fluid pressure control is to control the pitch of the blades of the propeller 275. If the aircraft 10 is designed to use propellers 275 with hydraulic pitch control, the hydraulics module 230 is placed in physical proximity of the propeller 275. Common module mounting interfaces will allow installation of a different accessory module 230 if a hydraulic fluid pressure control system is not required (the propeller 275 uses an electric pitch control system).

High Voltage Power Source

Electric airplanes can utilize different sources of energy. High density batteries are a widely used source. Another energy alternative can be hydrogen fuel cells. In both cases, the power source can be isolated as a fuel cell module 260. In practice, several modules 260 may be located in different places for increased capacity and/or redundancy. High Density battery modules 260 and hydrogen fuel cell modules 260 are typically larger and heavier compared to other modules. As a result, the location of these modules 260 will be determined considering available physical space and airplane weight distribution. The Electrical interfaces of these modules 260 will consist of low voltage input, high voltage output and control interface.

All fuel cell power modules 260 are equipped with the built-in leak detection and emergency shut off system (not shown). This system can be activated automatically upon hydrogen leak detection. In addition, a number of heat detectors may be installed at various locations in the airplane. Upon fire detection, the central computer is configured to activate a hydrogen shut off system. The system can also be activated manually upon a pilot's decision. Hydrogen shut off activation can be undone manually if the emergency situation has been resolved or in case of false alarm.

As another precaution during a catastrophic event (for example gear up emergency landing), there is an option to manually activate fuel cell 260 or hydrogen tank or cell ejection. Hydrogen tanks or cells 260 are mounted using pyro-fasteners. In the case of a catastrophic event, a series of procedures will disconnect hydrogen fuel lines and eject the tanks or cells 260 from the airplane 10.

All described modules will be mounted on standardized mounting interfaces throughout an airplane. Most of them will be located close to the main motors and will be mounted on the main motor frame. In addition, each module will be mounted using vibration dampening cushions 295. These cushions 295 are configured to prevent vibration from the propeller 275 (caused by air heterogeneity) which may spread onto or along the airplane frame. Also, the vibration dampening cushions 295 may be configured to prevent vibration from the airplane frame (again caused by high intensity air flow) from spreading into the sensitive electronic components.

Such a modular approach to power trains 200 provides a great advantage over prior art power trains 100 and allows ease of assembly and disassembly of the powertrain 200 and the various systems associated therewith. If repair is required, any component can be removed or replaced individually without affecting other components.

Another significant advantage of a modular powertrain 200 is that compatible components can be interchangeable. For example, if the airplane owner wishes to upgrade the system with new or better performing fuel cells 260,—the new fuel cells only require replacing the fuel cell module 260. The modular powertrain 200 also allows various manufacturers to produce compatible modules which can be interchanged with little effort. This will create a larger variety of configurations for the same aircraft to meet all customer needs.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in aircraft power plants. It is intended that the specification and examples be considered as exemplary only, with a true scope and spirit of the invention being indicated by the following claims.

What is claimed is:

1. A modular electric powertrain for retrofitting a propeller driven combustion aircraft, comprising:
   a mounting frame configured for retrofit engagement within a cowl of a combustion driven aircraft proximal an aircraft propeller, the mounting frame defining a mounting cavity therein;
   at least one electric motor mounted within the cowl of the combustion driven aircraft proximate the propulsion system; and
   a plurality of modular aircraft components selectively mountable within the cavity of the mounting frame, each modular component of the plurality of modular components independently accessible and interchangeable relative to the other of the plurality of modular components and powered by the at least one electric motor, the plurality of modular aircraft components selected from the group consisting of: cooling systems, fuel cells for powering the at least one electric motor, fuel cell cooling systems, high voltage control systems, low voltage control systems, hydraulic systems, control electronics, high voltage power sources, low voltage power sources, and electrical accessories.

2. The modular electric powertrain for retrofitting a propeller driven combustion aircraft according to claim 1, wherein each of the plurality of modular aircraft components is adapted for integration with existing aircraft controls and systems of the combustion driven aircraft.

3. The modular electric powertrain for retrofitting a propeller driven combustion aircraft according to claim 1, wherein the powertrain includes a subframe selectively engageable within the mounting frame for supporting one or more of the plurality of aircraft components therein, the subframe being independently accessible and interchangeable relative to the other aircraft components of the plurality of aircraft components mounted within the mounting frame and wherein the one or more of the plurality of aircraft components mounted within the subframe being independently accessible and interchangeable relative to the other one or more of the plurality of aircraft components mounted within the subframe.

4. The modular electric powertrain for retrofitting a propeller driven combustion aircraft according to claim 3, wherein the one or more of the plurality of aircraft components mounted within the subframe include at least one of high power controllers, cooling interfaces, and logical interfaces.

5. The modular electric powertrain for retrofitting a propeller driven combustion aircraft according to claim 1, wherein the one or more of the plurality of aircraft components includes a hydraulic fluid pressure control module, the hydraulic fluid pressure control module mounted within the mounting frame proximate the aircraft propeller.

6. The modular electric powertrain for retrofitting a propeller driven combustion aircraft according to claim 1, wherein the one or more of the plurality of aircraft components includes a hydrogen fuel cell power source selectively mountable within the mounting frame at a location in accordance with the overall weight distribution of the aircraft once retrofitted.

7. The modular electric powertrain for retrofitting a propeller driven combustion aircraft according to claim 6, wherein the hydrogen fuel cell power source is selectively ejectable from the mounting frame and the aircraft.

8. The modular electric powertrain for retrofitting a propeller driven combustion aircraft according to claim 1, wherein the one or more of the plurality of aircraft components includes a high density battery power source selectively mountable within the mounting frame at a location in accordance with the overall weight distribution of the aircraft once retrofitted.

9. The modular electric powertrain for retrofitting a propeller driven combustion aircraft according to claim 1, wherein the one or more of the plurality of aircraft components are mounted to the mounting frame with vibration dampening cushions.

10. The modular electric powertrain for retrofitting a propeller driven combustion aircraft according to claim 1, wherein the plurality of modular aircraft components are selectively mounted to locations on the mounting frame in accordance at least one of functionality, location to correlating components or aircraft systems, weight, size, life expectancy, ease of assembly or disassembly, or ejectability.

11. A modular electric powertrain for retrofitting a propeller driven combustion aircraft, comprising:
    a mounting frame configured for retrofit engagement within a cowl of a combustion driven aircraft proximal an aircraft propeller, the mounting frame defining a mounting cavity therein;
    at least one electric motor mounted within the cowl of the combustion driven aircraft proximate the propulsion system; and
    a plurality of modular aircraft components selectively mountable within the cavity of the mounting frame, each modular component of the plurality of modular components independently accessible and interchangeable relative to the other of the plurality of modular components and powered by the at least one electric motor, the plurality of modular aircraft components selected from the group consisting of: cooling systems, fuel cells for powering the at least one electric motor, fuel cell cooling systems, high voltage control systems, low voltage control systems, hydraulic systems, control electronics, high voltage power sources, low voltage power sources, and electrical accessories, wherein each of the plurality of modular aircraft components is adapted for integration with existing aircraft controls and systems of the combustion driven aircraft and wherein the powertrain includes a subframe selectively engageable within the mounting frame for supporting one or more of the plurality of aircraft components therein, the subframe being independently accessible and interchangeable relative to the other aircraft components of the plurality of aircraft components mounted within the mounting frame.

12. The modular electric powertrain for retrofitting a propeller driven combustion aircraft according to claim 11, wherein the one or more of the plurality of aircraft components mounted within the subframe is independently accessible and interchangeable relative to the other one or more of the plurality of aircraft components mounted within the subframe.

13. The modular electric powertrain for retrofitting a propeller driven combustion aircraft according to claim 11, wherein the one or more of the plurality of aircraft components mounted within the subframe include at least one of high power controllers, cooling interfaces, and logical interfaces.

14. The modular electric powertrain for retrofitting a propeller driven combustion aircraft according to claim 11, wherein the one or more of the plurality of aircraft components includes a hydraulic fluid pressure control module, the hydraulic fluid pressure control module mounted within the mounting frame proximate the aircraft propeller.

15. The modular electric powertrain for retrofitting a propeller driven combustion aircraft according to claim 11, wherein the one or more of the plurality of aircraft components includes a hydrogen fuel cell power source selectively mountable within the mounting frame at a location in accordance with the overall weight distribution of the aircraft once retrofitted.

16. The modular electric powertrain for retrofitting a propeller driven combustion aircraft according to claim 15, wherein the hydrogen fuel cell power source is selectively ejectable from the mounting frame and the aircraft.

17. The modular electric powertrain for retrofitting a propeller driven combustion aircraft according to claim 11, wherein the one or more of the plurality of aircraft components includes a high density battery power source selectively mountable within the mounting frame at a location in accordance with the overall weight distribution of the aircraft once retrofitted.

18. The modular electric powertrain for retrofitting a propeller driven combustion aircraft according to claim 11, wherein the one or more of the plurality of aircraft components are mounted to the mounting frame with vibration dampening cushions.

19. The modular electric powertrain for retrofitting a propeller driven combustion aircraft according to claim 11, wherein the plurality of modular aircraft components are selectively mounted to locations on the mounting frame in accordance at least one of functionality, location to correlating components or aircraft systems, weight, size, life expectancy, ease of assembly or disassembly, or ejectability.

* * * * *